H. GINNEL.
BRACELET.
APPLICATION FILED FEB. 24, 1915.
1,160,277.
Patented Nov. 16, 1915.
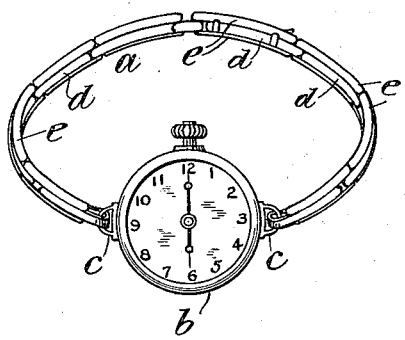
Fig. 1.
Fig. 2.
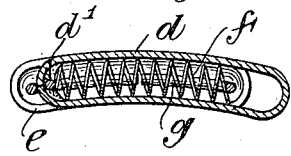
Fig. 3.
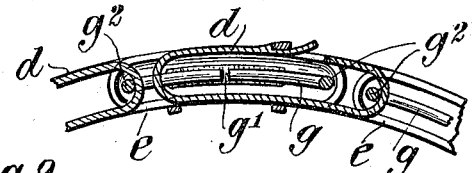
Fig. 9.
Fig. 4.
Fig. 5.
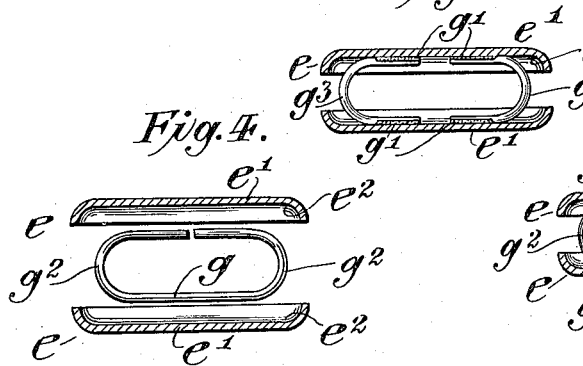
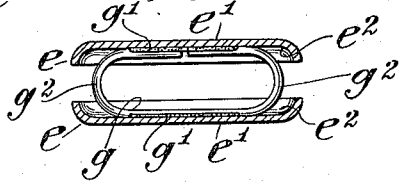
Fig. 6.
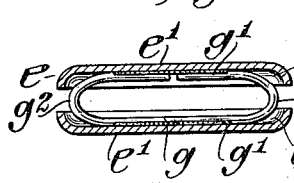
Fig. 7.
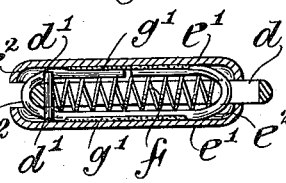
Fig. 8.
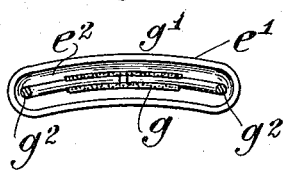
WITNESSES
Geo. Schwartz
Francis J. Murphy
INVENTOR
Henry Ginnel
BY
Redding, Greeley, Woollett
ATTORNEYS

UNITED STATES PATENT OFFICE.

HENRY GINNEL, OF NEW YORK, N. Y.

BRACELET.

1,160,277.  Specification of Letters Patent.  Patented Nov. 16, 1915.

Application filed February 24, 1915. Serial No. 10,252.

*To all whom it may concern:*

Be it known that I, HENRY GINNEL, a citizen of of the United States, residing in the borough of Brooklyn of the city of New York, in the county of Kings, in the State of New York, have invented certain new and useful Improvements in Bracelets, of which the following is a specification, reference being had to the accompanying drawing, forming a part hereof.

Bracelets for ladies' wear, especially those which are intended for use with wrist watches, are commonly made with expansible members and have incorporated in their structure springs which take up slack and make the bracelet fit snugly about the wrist, but yield to permit the bracelet to fit a larger as well as a smaller wrist and to be slipped on and off over the hand. Such bracelets usually consist of two kinds of links, a link of one kind sliding within a link of another kind, as in a housing. The spring to take up slack in the bracelet, if employed, is housed within the two links of a pair and, if the bracelet is well made, is not ordinarily visible. Sometimes, the spring is omitted between the two members of a pair, as in the case where means are provided for holding the two members of a pair positively in their contracted relation but may be released to permit the two ends of a bracelet to be connected or disconnected to or from each other or to or from a watch. In any case the two members of a pair must be so interengaged that they are not liable to accidental separation, must be free for relative and proper movement, the one being guided within the other, and must be connected by devices which are sufficiently strong to withstand considerable strain. To construct such a bracelet so that it will answer all of the requirements of use and can be assembled without too much difficulty has hitherto seemed to require the adoption of such features and expedients as have made the cost of labor a considerable item in the cost of such bracelets, especially in other than bracelets of solid precious metals. One member of each pair of members of such a bracelet usually consists of a simple loop of metal, either continuous or completely closed or made with a cut or separation at some point, and provided at one end with projecting lugs. The other member of such pair usually consists of two side bars united by pins at the ends and channeled on their inner faces. The first mentioned member embraces the pin between the two side bars at the end of the next link and straddles the pin at the adjacent end of the outer member of its own pair, its lugs traveling in the channels of the side bars of that pair. The spring, if used, is housed within the loop of the inner member and between the side bars of the outer member, and bears at one end against the end of the loop of the inner member and at the other end against the pin between the side bars of the other member. In the construction of such bracelets each pin is first soldered with hard solder in one end of one of the side bars and the other bar is then applied and soldered with hard solder to the ends of the pins which project from the first side bar. This is not only a rather delicate operation, but it requires four different soldering operations and the use (in order that the connection may be sufficiently strong) of hard solder, while the relatively great heat required by the use of hard solder draws the temper of the side bars at the ends to such an extent as to make it necessary to use heavier metal than would otherwise be required. The inner member of each pair is then, as an open link, made to engage the pin at one end of the outer member to its own pair and the pin at the adjacent end of the outer member of the next pair, being subsequently closed if desired. It then remains to insert the spring, if one is used. This is done by spreading the side bars of the outer member sufficiently to permit the spring to be slipped into place. The side bars are not of spring metal and are therefore distorted in this operation. They must then, after the spring is inserted, be pressed back into place and into shape as nearly as is possible. As a matter of fact it is difficult to restore the side bars of the outer member to their original form and close inspection of cheap bracelets will often show that it has been done imperfectly. Sometimes, in goods of a better class, there is secured by hard solder in each end of one of the side bars a tubular stud, and in each end of the other side bar a solid pin which can be made to enter the corresponding tubular stud, the two being afterward secured together by soft solder or by compression, but this further increases the cost of labor in the production of a bracelet.

It is the object of this invention to improve the structure of bracelets of this general character in such a manner as to reduce very considerably the cost of labor in the production, to avoid the distortion of the side bars of the outer member, to make it possible to use thinner metal in the construction of the side bars (since the temper is not drawn by the use of hard solder), to make it unnecessary to use hard solder, and at the same time to make a stronger and better construction which shall not be liable to breakage through the imperfect soldering of the pins which often happens, especially in cheap goods. In accordance with the invention, the use of pins to unite the two side bars of the outer member of each pair is wholly avoided and in their place is provided a loop of suitable wire which is soldered, with soft solder, to the side bars of the outer member at and near their middle points. As soldered in place, the loop is slightly wider and slightly shorter than it will be in the finished article, so that the side bars, when the member is first formed, are held sufficiently far apart to permit easy assembling of the members of each pair and of successive links, including the insertion of the spring, if one is employed, and after the assembling the two side bars are pressed toward each other, without distortion of either side bar, the ends of the wire loop, being themselves curved, yielding sufficiently to permit this to be accomplished. Such narrowing of the loop lengthens it slightly so that in the finished article the ends of the loops are at the proper points for engagement by the inner members of the several pairs.

The invention will be more fully explained hereinafter with reference to the accompanying drawing in which it is illustrated and in which—

Figure 1 is a view in perspective showing a bracelet to which the invention may be applied in connection with a wrist watch. Fig. 2 is a view on a larger scale showing one of the links of the bracelet composed of two members with an interposed spring. Fig. 3 is a similar view showing two members of a link without an interposed spring and a portion of adjacent links. Fig. 4 is a detail view of one of the outer links of a pair showing its parts separated with the outer members in section. Fig. 5 is a similar view but showing the parts assembled and secured by solder, the said bars being somewhat widely separated as when the link is first constructed. Fig. 6 is a view similar to Fig. 5 but showing the side bars pressed toward each other into the relation which they occupy in the finished product. Fig. 7 is a detail view in section showing the two members of the improved link assembled with the spring in place. Fig. 8 is a detail view in section showing the inner and outer members of a link in assembled relation without the interposed spring, the plane of section being at right angles to that of Figs. 4 and 5. Fig. 9 is a detail view, similar to Fig. 5, but showing a modification.

In the application of the invention illustrated in Fig. 1 of the drawing, an expansion bracelet $a$ is shown as secured to a wrist watch $b$ and as having at its middle a separable member $c$.

Each link of the bracelet $a$ may be regarded for convenience as consisting of two members, an inner member $d$ and an outer member $e$. The inner member $d$ may be constructed substantially as usual, consisting of a loop, either closed or open as may be desired, provided at one end with projecting lugs $d'$ which serve, in coöperation with the outer member, to guide the inner member in its movements. The outer member $e$ consists of two side bars $e'$, which are suitably shaped and channeled in their inner, opposing faces as at $e^2$ to receive and guide the projecting lugs $d'$ of the inner bar. Most of the links of the bracelet include also, in each, a spring $f$ which serves to maintain the two members of each link in their contracted relation, but permits them to be displaced longitudinally for expansion of the bracelet.

The present invention is concerned chiefly with the construction of the outer member $e$ of each pair or link. The side bars $e'$ of this member are formed substantially as usual. Instead of being secured together by pins at the ends, soldered in place with hard solder, in the usual manner, the side bars of the improved link member are secured together by an interposed loop or suitable wire $g$, which is soldered to the side bars $e'$ at and near the middle points, but not necessarily near their ends. This wire loop is sufficiently secured by means of soft solder, as at $g'$ and both side bars are secured with practically one operation of soldering. When the wire loop and side bars are first assembled, the wire loop, as shown in Figs. 4 and 5, is somewhat wider and slightly shorter than it is in the completed article. This spaces the two side bars far enough apart, when the link is first formed, to permit the inner member $d$ and the spring $f$ to be put in place without difficulty. Thereafter the two side bars are pressed toward each other until they occupy the desired permanent relation, the curved ends $g^2$ of the wire loop bending readily to permit this result to be accomplished.

It will be understood that in links in which no spring is employed, as in the detachable link $c$, the outer member may be constructed in the same way as already described and no further explanation is necessary.

It will be obvious that although the wire loop is preferably made in one piece, it might be made in two parts, $g^3$ and $g^4$, as shown in Fig. 9, soldered into the side bars $e'$ as before. This construction, equally with the other and in the same way, has the advantages of the curved ends which permit the side bars to be pressed toward each other.

It will be understood that the form and proportions of parts will be varied to suit different uses and that the invention is not restricted to the precise details of construction shown and described herein.

I claim as my invention:—

1. A link member for a bracelet comprising two side bars and an interposed loop secured to the side bars and holding them in operative relation.

2. A link member for a bracelet comprising two side bars and an interposed loop with curved ends secured to the side bars and holding them in operative relation.

3. A link member for a bracelet comprising two side bars and an interposed loop with curved ends soldered to the side bars and holding them in operative relation.

4. A link member for a bracelet comprising two side bars and an interposed wire loop soldered to the side bars at and near their middle points and holding them in operative relation.

5. A link for a bracelet composed of an outer member and an inner member relatively movable in a longitudinal direction, the outer member comprising two side bars and an interposed wire loop secured to the side bars and holding them in operative relation and the inner member being formed as a loop and straddling one end portion of the wire loop.

This specification signed and witnessed this 18th day of February, A. D. 1915.

HENRY GINNEL.

Signed in the presence of—
ELLA J. KRUGER,
WORTHINGTON CAMPBELL.

Copies of this patent may be obtained for five cents each, by addressing the "Commissioner of Patents, Washington, D. C."